United States Patent [19]

Glantz et al.

[11] 4,456,624

[45] Jun. 26, 1984

[54] PROCESS FOR MAKING FRENCH FRIED POTATOES

[75] Inventors: Jerome J. Glantz, Tualatin; Michael G. Doenges, Newberg, both of Oreg.

[73] Assignee: Lamb-Weston, Inc., Portland, Oreg.

[21] Appl. No.: 457,911

[22] Filed: Jan. 14, 1983

[51] Int. Cl.³ .............................................. A23L 1/216
[52] U.S. Cl. ........................................ 426/96; 426/102; 426/273; 426/295; 426/438; 426/637; 426/808
[58] Field of Search ................. 426/96, 102, 273, 295, 426/438, 637, 808, 281

[56] References Cited

U.S. PATENT DOCUMENTS

| | | | |
|---|---|---|---|
| 1,985,238 | 12/1934 | Brogden | 426/295 |
| 2,893,332 | 7/1959 | Roser et al. | 426/295 X |
| 2,967,493 | 1/1961 | Cloud et al. | 426/295 |
| 3,306,751 | 2/1967 | Appleby | 426/295 |
| 3,363,586 | 1/1968 | Jernigan et al. | 426/295 |
| 3,397,993 | 8/1968 | Strong | 426/637 X |
| 3,427,951 | 2/1969 | Mitan et al. | 426/302 |
| 3,649,305 | 3/1972 | Wilder | 426/637 X |
| 3,865,964 | 2/1975 | Kellermeier et al. | 426/438 X |
| 4,186,216 | 1/1980 | Roth | 426/519 X |
| 4,254,153 | 3/1981 | Ross et al. | 426/637 X |
| 4,297,377 | 10/1981 | Harney et al. | 426/438 |

FOREIGN PATENT DOCUMENTS 0026565  4/1981  European Pat. Off. ............ 426/637

*Primary Examiner*—Arthur L. Corbin
*Attorney, Agent, or Firm*—Klarquist, Sparkman, Campbell, Leigh & Whinston

[57] ABSTRACT

A method of preparing french fried potato strips includes cutting whole potatoes into strips, preheating the strips in water and impinging a high velocity stream of food particles against the strips to embed the same in outer surfaces of the strips. The particle impacted strips are dried, steam-blanched, parfried and frozen. When reconstituted, the potato strips have a crisp, palatable outer surface, a fluffy interior, enhanced flavor and relatively low oil perception.

31 Claims, 1 Drawing Figure

– 4,456,624 –

PROCESS FOR MAKING FRENCH FRIED POTATOES

The present invention relates generally to food processing, and more particularly to a method for applying a particulate media to the outer surface of a food product, especially a french fried potato strip.

BACKGROUND OF THE INVENTION

Frozen french fried potato strips are typically prepared by washing, peeling and cutting into strips whole potatoes and then blanching, parfrying and freezing the strips. Heretofore, attempts have been made, without much success, to deposit on outer surfaces of such strips a relatively dry particulate media, such as starch, seasonings, flavor particulates or the like thereby to enhance the flavor and texture of the product or to create an altogether different tasting product. Such attempts have also been intended to improve the coloration of the product and to reduce its oil perception (content) when reconstituted by frying.

For example, potato strips have been dusted with a media after blanching. However, the media has not adhered well to the strips, and consequently most of the media fell off during further processing, typically during parfrying. As a subsidiary problem, the loose media contaminates the fryer.

More generally, bread crumbs have been applied commercially to food products after dipping the product in a batter to which the crumbs adhere. See, for example, Wood U.S. Pat. No. 4,208,435 and Frum U.S. Pat. No. 3,767,826. However, the heavy, batter-fried taste characteristic of such a product is not desirable for french fried potato strips and may not be desirable for other food products as well.

Aqueous coatings have also been applied to food products using well known spray, slurry and enrobing techniques. For example, Roth U.S. Pat. No. 3,607,313 shows a method of coating quick-frozen, discrete food pieces by spraying them with a sauce-like liquid in a tumbling drum. And, Mitan et al, U.S. Pat. No. 3,427,951 shows a process in which a starch base slurry is used to dip or spray a food product to give it a protective film. However, such techniques inherently are not suitable for applying a relatively dry particulate media to the outer surface of a food product.

Accordingly, there is a need for a process for applying a relatively dry particulate media to the outer surface of a food product, particularly a french fried potato strip, such that the media is substantially retained on the product during processing and gives it an improved character.

It is therefore an important object of the invention to provide a process for applying a particulate media to the outer surface of a food product, such as a french-fried potato strip, such that the media is substantially retained on the product after processing.

A second important object of the invention to provide a process as aforesaid in which french fried potato strips processed thereby have improved characteristics.

A more specific object of the invention is to provide a process as aforesaid in which potato strips processed thereby have a crisper, more palatable surface texture than prior potato strips.

A further object of invention is to provide a process as aforesaid in which potato strips processed thereby have an enhanced flavor.

Another object of the invention is to provide a process as aforesaid in which potato strips processed thereby have a lower oil perception than prior strips.

Still another object of the invention is to provide a process as aforesaid which causes minimal contamination to the fryer during parfrying or reconstitution.

Other objects and advantages of the invention will become apparent from the drawings and following detailed description.

SUMMARY OF THE INVENTION

In accordance with the foregoing objects, the present invention comprises a process for preparing food products such as french-fried potato strips with an adherent coating. Whole potatoes are peeled and cut into strips. The strips are impinged with a high velocity stream of particles, such as potato granules, so as to embed the particles in outer surfaces of the strips. The velocity of the stream is not so high as to damage the structural integrity of the strips. Prior to impinging, the strips may be preheated in water and chemically treated in a flume. The particle-impacted strips are preferably partially dried, steam-blanched, parfried in oil and frozen. The frozen potato strips are conventionally reconstituted, such as by baking or frying in oil. The resulting product has a crisp, golden outer surface, fluffy interior, enhanced flavor and low oil perception.

DETAILED DESCRIPTION OF A PREFERRED EMBODIMENT

Process and Product

Figure 1:
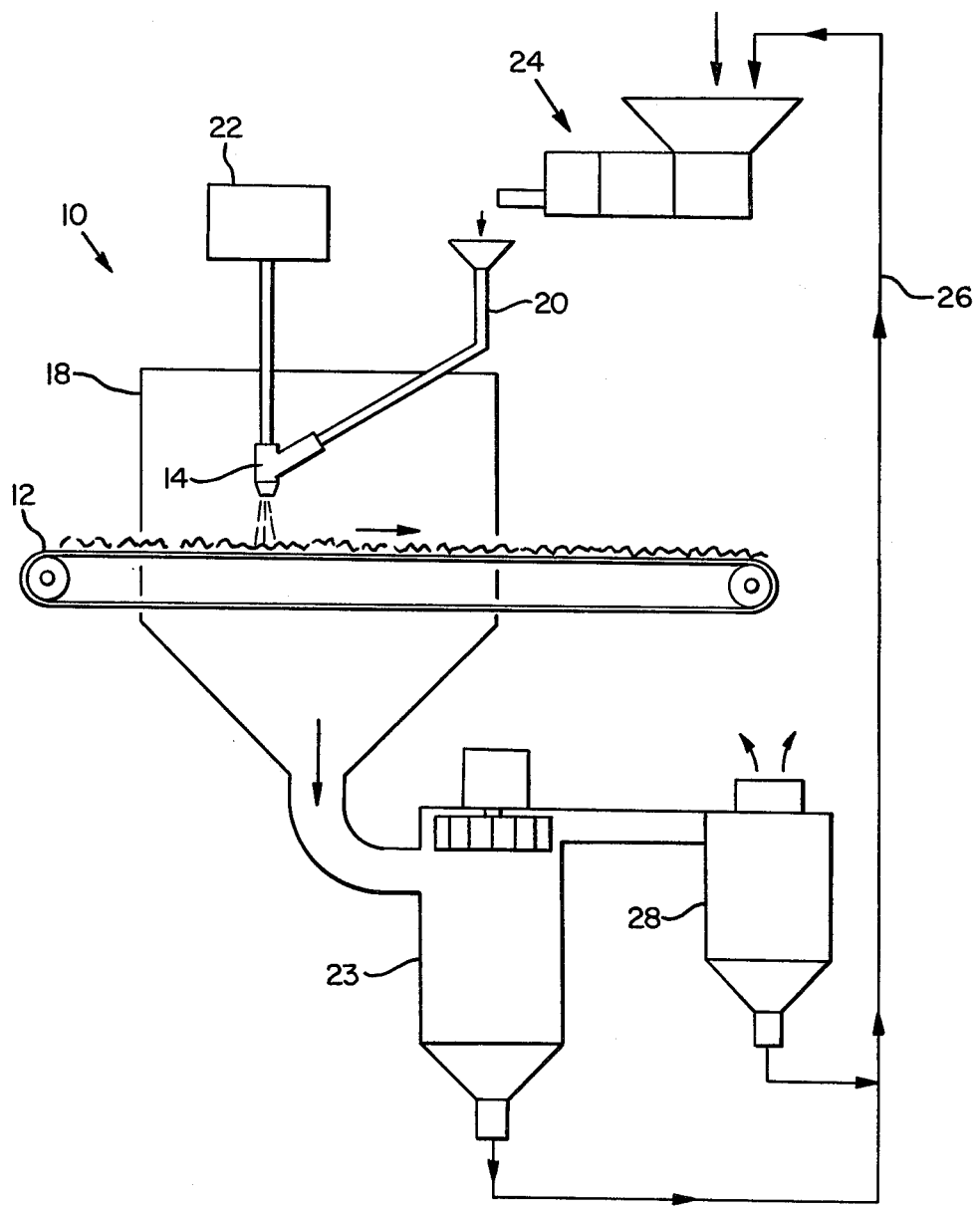
FIG. 1 is a schematic view of a particle impinging apparatus in accordance with the present invention.

In accordance with one application of the present invention potatoes are held in storage under conventional accepted conditions so as not to accumulate excessive amounts of sugar therein. Potatoes of the Russet-Burbank variety are preferred. The potatoes are cleaned with a water flume or spray, and then peeled in a conventional manner, using steam or a caustic solution. The potatoes are cut into sections suitably sized for french fried potato strips.

The strips are next preheated, either in water at a temperature within the range of about 150° F. to 190° F. or steam at a temperature within the range of about 190° F. to 220° F. for about 1–15 minutes. Preferably, the preheating is carried out in water at about 155° F. for about 5 minutes, to leach the natural sugars therein and to condition the strips. Such conditioning includes softening and moistening the strip surfaces. The preheated strips are treated in a flume containing about 0.75% Sodiumacidpyrophosphate (SAPP), a preservative and color brightener. Other preservatives, such as $SO_2$, HCl, or coloring agents, such as dextrose, may be added to the flume or substituted for the SAPP in a known manner. The strips are dipped for about 10–60 seconds in the flume, and preferably for about 20 seconds.

As illustrated by FIG. 1, a bed of treated strips are thereafter passed on a conveyor screen under a blasting nozzle, and a high velocity stream of particles is impinged upon the strips. The particles, preferably having a size of about 80–100 mesh, embed in outer surfaces of the strips. Particles comprising about 100 percent potato granules, such as those sold by Basic American Potato Company, Moses Lake, Washington, work well. Other particulate media, including potato flakes, potato flour, potato granules with nacho cheese seasoning, potato granules with tallow flavoring, or a mix of potato granules and starch, may also be used.

The potato granules are impacted against the bed of strips for about 5 to 20 seconds, and preferably for about 10 seconds, causing the strips to undergo a weight gain of about 4%. The impinging velocity of the granules must be large enough to embed or impregnate the granules in the outer cellular surface layers of the strips, but not so great as to destroy the structural integrity of the strips. The exit velocity of the granules as they leave the nozzle is believed to be within the range of 550 ft/sec to 750 ft/sec, and has been roughly calculated to be about 650 ft/sec. It is not known, however, whether the actual impact velocity of the granules is less or greater than the exit velocity. The high velocity of the air stream associated with the granules agitates the bed such that no one strip is subject to the impinging granules for the full 10 seconds.

The granule-impacted strips are partially dried in a dryer at a temperature within the range of about 150° F. to 250° F. to cause an estimated 10-30% moisture weight loss in the strips. Drying at about 200° F. for a time sufficient to cause a 20% moisture weight loss is preferred. Thereafter, the strips are steam blanched at a temperature within the range of about 190° F.-220° F. for about 2-10 minutes, and preferably at about 200° F. for about 2 minutes.

The blanched strips are then parfried in hot oil at a temperature within the range of about 340° F. to 380° F. for about 5-120 seconds, and preferably at about 370° F. for about 15 seconds. If prepared according to the foregoing parameters, the parfried strips will have a solids content of about 34-37%, including about 5-10% oils (typically about 7-8% oils). For purposes of storage and/or shipment, the strips are frozen in a conventional manner.

The frozen potato strips are reconstituted by frying them in oil at a temperature of about 350° F. for about 2½ minutes, or by other conventional methods, such as baking or heating in a microwave oven.

The embedded potato granules give the strips an unusually high solids content at their outer surfaces, thereby causing the strips to have a crisper, more palatable surface texture than prior strips and an enhanced flavor upon reconstitution.

The solids content of potato strips increases during frying through the absorption of oil and the loss of moisture from the strips. As the oil content increases due to the absorption of oil, the oil perception by the consumer also ordinarily increases. It is undesirable to have a perception of high oil content. However, strips prepared in accordance with the invention advantageously exhibit a relatively low oil content and therefore a low oil perception and less greasy character than prior products. This is due in part to the imbedded potato granules which seem to act as a partial barrier to the oil during parfrying, and also refrying. It is also due to a relatively short parfrying time. A longer, more conventional parfry is not necessary because the strips have a relatively high solids content even before parfrying, by reason of the addition of the potato granules to the surface, and hence attain the commonly preferred solids content of about 34-37% during the foreshortened parfry, as moisture is lost during parfrying.

Yet another advantage of such potato strips is that they retain their crispness longer after refry than conventionally prepared strips.

Potato granule-impacted potato strips are similar in appearance to conventional potato strips, although they "puff up" slightly during parfrying and have a slightly rougher surface texture. Electron micrographs of the strips show disruption of the outer cellular tissue with a fairly uniform embedding of potato granules therein. A particulate media applied in this way is not likely to fall off during processing.

Impinging Apparatus

Referring again to FIG. 1, a particle impinging apparatus 10 includes a conveyor 12 upon which a bed of potato strips are transported beneath the flow path of a nozzle 14 encased in a housing 18. Nozzle 14, which receives potato granules from a feed line 20, is driven by an air compressor 22.

Loose potato granules which do not embed in the strips fall to the bottom of housing 10, where they are recycled by a cyclone 23 to a media feeding means 24 through a line 26. Similarly, fines from cyclone 23 are filtered in a bag house 28 and returned to feeding means 24. In this way, undeposited granules are continuously recycled and thereby conserved.

EXAMPLE I

Russet-type potatoes were washed, peeled and cut into strips, yielding about 5 lbs. of product. The strips were conditioned slightly by preheating them in water at a temperature of about 155° F. for about 5 minutes, and then dipped for about 20 seconds in a flume containing about 0.75% SAPP. The strips were next subjected to a high velocity stream of potato granules carried in air.

The granules had a size of about 80-100 mesh and were obtained from Basic American Potato Company. A standard handgun or blasting nozzle manufactured by Zero Manufacturing Company, Washington, Missouri, model number BNP55-7, was used. It had a #5 orifice (5/32 inch diameter opening) and a #5 nozzle (5/16 inch diameter opening). A stream flow rate of about 35 CFM at about 85 psi was used, yielding a roughly estimated nozzle exit velocity for the granules of about 650 feet per second. The nozzle was positioned about 12 inches from the 5 lb. product which was exposed to the stream for about 10 seconds. The potato granules embedded in outer surfaces of the strips. The stream agitated the product to expose all the strips during that time.

The granule-impacted strips were then partially dried at a temperature of about 200° F. until they underwent a moisture weight loss of about 20%. The strips were steam blanched at a temperature of about 200° F. for about 2 minutes, parfried at a temperature of about 370° F. for about 15 seconds, and frozen at a temperature of about −10° F.

The frozen strips were reconstituted by frying them in oil at a temperature of about 350° F. for about 2½ minutes. The resulting strips had crisp, golden outer surfaces, fluffy potato interiors, enhanced flavor and relatively low oil perception. They had an average solids content of about 54.7%, including about 12.8% oils, as compared to a solids content after parfrying of about 35.4%, including about 7.2% oils. A control sample processed in a similar manner, but without the impinging step, had increased oil content of about 8.5% and 15.5% after parfrying and refrying, respectively.

EXAMPLE II

Potato strips were processed in the above manner, except that they were reconstituted by baking in oven at a temperature of about 425° F. for about 10 minutes. The resulting strips had a relatively crisp outer surface, mealy potato interior, enhanced flavor and golden coloration.

It will be apparent to those skilled in the art that the described process can be used with other than potato-type products, including fruits and vegetables, although the required impinging velocity of the media may vary depending upon the outer cellular strength of the particular product.

Having illustrated and described the principles involved in this invention by what is presently a preferred embodiment and several suggested alternatives, it should be apparent to those persons skilled in the art that such embodiments may be modified in arrangement and detail without departing from such principles. We claim as our invention all such modifications as come within the true spirit and scope of the invention as defined by the following claims.

I claim:

1. A method of preparing french fried potato strips comprising the steps of:
   cutting raw potatoes into strips; and
   impinging a stream of food particles upon the strips at a velocity sufficient to embed such particles in an outer cellular surface layer of the strips and disrupt the outer cellular surface tissue of the strips without destroying the structural integrity of the strips.

2. The method of claim 1 wherein the particles are impinged upon the strips at a velocity within the range of about 550 to 750 feet per second.

3. The method of claim 1 further comprising preheating the strips to condition the surfaces thereof prior to impinging.

4. The method of claim 3 wherein the strips are preheated at a temperature within the range of about 150° F. to 220° F. for about 1-15 minutes.

5. The method of claim 1 further comprising blanching the strips subsequent to impinging.

6. The method of claim 1 further comprising parfrying the strips subsequent to impinging.

7. The product prepared in accordance with the method of claim 1.

8. A method of preparing french fried potato strips comprising the steps of:
   cutting raw potatoes into strips;
   preheating the strips;
   impinging a stream of food particles upon the strips at a velocity sufficient to embed such particles in an outer cellular surface layer of the strips and disrupt the outer cellular surface tissue of the strips without destroying the structural integrity of the strips
   blanching the strips; and
   parfrying the strips.

9. A method of preparing french fried potato strips comprising the steps of:
   cutting raw potatoes into strips;
   preheating the strips in water at a temperature within the range of about 150° F. to 190° F. for about 1-15 minutes;
   impinging a stream of potato granules upon the strips at a velocity sufficient to embed such particles in an outer cellular surface layer of the strips and disrupt the outer cellular surface tissue of the strips without destroying the structural integrity of the strips
   partially drying the strips at a temperature within the range of about 150° F. to 250° F. to cause a moisture weight loss of about 10-30%;
   steam blanching the strips at a temperature within the range of about 190° F. to 220° F. for about 2-10 minutes;
   parfrying the strips at a temperature within the range of about 340° F. to 380° F. for about 5-120 seconds; and
   freezing the strips.

10. A process of preparing french fried potato strips comprising the steps of:
    cutting raw potatoes into strips;
    transporting the strips on a conveyor through an enclosed housing;
    within the housing impinging through a nozzle a stream of potato particles upon the strips to embed the potato particles in an outer cellular surface layer of the strips and disrupt the outer cellular surface tissue of the strips without destroying the structural integrity of the strips; and
    recycling undeposited potato particles from a bottom portion of the housing to a feeding means for feeding potato particles to the nozzle.

11. A french fried potato strip having an edible particulate media embedded substantially uniformly in the outermost cellular layers of the strip, said particulate media disrupting the outer cellular surface tissue of the strip without destroying the structural integrity of the strip.

12. A french fried potato strip having an edible particulate media embedded substantially uniformly in the outermost cellular layers of the strip, said particulate media disrupting the outer cellular surface tissue of the strip without destroying the structural integrity of the strip, the particulate media including potato granules having a size of about 80-100 mesh.

13. A method of preparing french fried potato strips comprising the steps of:
    cutting raw potatoes into strips; and
    impinging a stream of potato particles upon the strips at a velocity sufficient to embed such particles in an outer cellular surfaces layer of the strips and disrupt the outer cellular surface tissue of the strips without destroying the structural integrity of the strips.

14. The method of claim 13 further comprising preheating the strips to condition the surfaces thereof prior to impinging.

15. The method of claim 14 wherein the strips are preheated at a temperature within the range of about 150° F. to 220° F. for about 1-15 minutes.

16. The method of claim 14 wherein the particles comprise potato granules.

17. The method of claim 14 wherein the particles are impinged upon the strips at a velocity within the range of about 550 to 750 feet per second.

18. The method of claim 17 wherein the particles are impinged upon a bed of the strips for about 5-20 seconds.

19. The method of claim 14 wherein the particles have a size within the range of about 80-100 mesh.

20. The method of claim 19 wherein the particles comprise potato granules.

21. The method of claim 14 wherein the strips are partially dried subsequent to impinging at a temperature within the range of about 150° F. to 250° F. such that the strips undergo a moisture weight loss of about 10-30%.

22. The method of claim 14 further comprising blanching the strips subsequent to impinging.

23. The method of claim 22 wherein the strips are blanched at a temperature within the range of about 150° F. to 220° F. for about 2-10 minutes.

24. The method of claim 14 further comprising parfrying the strips subsequent to impinging.

25. The method of claim 24 wherein the strips are parfried at a temperature within the range of about 340° F. to 380° F. for about 5-120 seconds.

26. The product prepared in accordance with the method of claim 14.

27. A method of preparing french fried potato strips comprising the steps of:

cutting raw potatoes into strips;

preheating the strips;

impinging a stream of potato particles upon the strips at a velocity sufficient to embed such particles in an outer cellular surface layer of the strips and disrupt the outer cellular surface tissue of the strips without destroying the structural integrity of the strips;

blanching the strips; and parfrying the strips.

28. The method of claim 27 further comprising partially drying the strips subsequent to impinging and prior to blanching.

29. The method of claim 28 further comprising freezing the strips subsequent to parfrying.

30. The method of claim 27 wherein the particles comprise potato granules having a size within the range of about 80-100 mesh.

31. The method of claim 30 wherein the particles are impinged upon a bed of the strips at a velocity within the range of about 550 ft/sec to 750 ft/sec for about 5-20 seconds.

* * * * *

UNITED STATES PATENT AND TRADEMARK OFFICE
CERTIFICATE OF CORRECTION

PATENT NO. : 4,456,624

DATED : June 26, 1984

INVENTOR(S) : JEROME J. GLANTZ and MICHAEL G. DOENGES

It is certified that error appears in the above-identified patent and that said Letters Patent are hereby corrected as shown below:

Column 5, line 6, "an" should be inserted between "in" and "oven".

Column 6, line 47, "surfaces" should be --surface--.

Signed and Sealed this

Twenty-third Day of October 1984

[SEAL]

Attest:

Attesting Officer

GERALD J. MOSSINGHOFF

Commissioner of Patents and Trademarks